（12）United States Patent
Chen et al.

(10) Patent No.: US 11,207,788 B2
(45) Date of Patent: Dec. 28, 2021

(54) HAND CONTROL APPARATUS AND HAND CONTROL SYSTEM

(71) Applicant: FANUC CORPORATION, Yamanashi (JP)

(72) Inventors: Wenjie Chen, Yamanashi (JP);
Tetsuaki Kato, Yamanashi (JP);
Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 296 days.

(21) Appl. No.: 16/266,231

(22) Filed: Feb. 4, 2019

(65) Prior Publication Data
US 2019/0308333 A1 Oct. 10, 2019

(30) Foreign Application Priority Data

Apr. 10, 2018 (JP) .............................. JP2018-075572

(51) Int. Cl.
B25J 15/10 (2006.01)
B25J 9/16 (2006.01)
B25J 13/08 (2006.01)

(52) U.S. Cl.
CPC ........... B25J 15/103 (2013.01); B25J 9/1694 (2013.01); B25J 13/085 (2013.01)

(58) Field of Classification Search
CPC ...... B25J 15/103; B25J 9/1694; B25J 13/085; B25J 9/1612; B25J 15/10; B25J 15/0009;
(Continued)

(56) References Cited

U.S. PATENT DOCUMENTS

2009/0173560 A1 7/2009 Nakamoto et al.
2011/0288683 A1 11/2011 Kondo et al.
(Continued)

FOREIGN PATENT DOCUMENTS

CN 107225576 A 10/2017
EP 1 992 455 A1 11/2008
(Continued)

OTHER PUBLICATIONS

Japanese Office Action dated Oct. 20, 2020, in connection with corresponding JP Application No. 2018-075572 (13 pp., including machine-generated English translation).

(Continued)

Primary Examiner — Basil T. Jos
(74) Attorney, Agent, or Firm — Maier & Maier, PLLC

(57) ABSTRACT

A hand control apparatus including an extracting unit extracting a grip pattern of an object having a shape closest to that of the object acquired by a shape acquiring unit from a storage unit storing and associating shapes of plural types of objects and grip patterns, a position and posture calculating unit calculating a gripping position and posture of the hand in accordance with the extracted grip pattern, a hand driving unit causing the hand to grip the object based on the calculated gripping position and posture, a determining unit determining if a gripped state of the object is appropriate based on information acquired by at least one of the shape acquiring unit, a force sensor and a tactile sensor, and a gripped state correcting unit correcting at least one of the gripping position and the posture when it is determined that the gripped state of the object is inappropriate.

5 Claims, 7 Drawing Sheets

(58) Field of Classification Search
CPC ........ B25J 13/082; B25J 13/08; B25J 13/084; B25J 9/161; B25J 15/12; G05B 2219/39531; G05B 2219/39532; G05B 2219/39534; G05B 2219/39543; G05B 2219/40575
See application file for complete search history.

(56) References Cited

U.S. PATENT DOCUMENTS

| | | | |
|---|---|---|---|
| 2012/0004774 | A1 | 1/2012 | Umetsu |
| 2012/0059517 | A1* | 3/2012 | Nomura ................ B25J 9/1679 700/259 |
| 2013/0178978 | A1 | 7/2013 | Kim et al. |
| 2014/0214202 | A1 | 7/2014 | Nammoto et al. |
| 2016/0114485 | A1 | 4/2016 | Nomura |
| 2020/0346347 | A1* | 11/2020 | Sankai ................ A61H 1/0274 |

FOREIGN PATENT DOCUMENTS

| | | | |
|---|---|---|---|
| EP | 1992455 | A1 | 11/2008 |
| EP | 2460628 | A2 | 6/2012 |
| JP | H06-102980 | A | 4/1994 |
| JP | H06-126684 | A | 5/1994 |
| JP | H07246581 | A | 9/1995 |
| JP | H10-249767 | A | 9/1998 |
| JP | 2004-284001 | A | 10/2004 |
| JP | 2005230952 | A | 9/2005 |
| JP | 2007-098501 | A | 4/2007 |
| JP | 2007-125653 | A | 5/2007 |
| JP | 2007125653 | A | 5/2007 |
| JP | 2008-055584 | A | 3/2008 |
| JP | 2010179443 | A | 8/2010 |
| JP | 2011-224695 | A | 11/2011 |
| JP | 2012-006097 | A | 1/2012 |
| JP | 2012-011531 | A | 1/2012 |
| JP | 2012055999 | A | 3/2012 |
| JP | 2014144526 | A | 8/2014 |
| JP | 2017-185578 | A | 10/2017 |
| WO | 2007/088735 | A1 | 8/2007 |
| WO | 2007088735 | A1 | 8/2007 |

OTHER PUBLICATIONS

Search Report dated Apr. 27, 2020 in corresponding Japanese Application No. 2018-075572; 21 pages including English-language translation.

Office Action dated May 26, 2020 in corresponding Japanese Application No. 2018-075572; 11 pages including English-language translation.

Niwa et al. "Automatic Generation of Optimum Planar Grasp based on Static Stability." Proceedings of the 2014 JSME Conference on Robotics and Mechatronics, The Japan Society of Mechanical Engineers. May 25-29, 2014. 3P2-R03. 16 pages.

Yamada et al. "Automatic generation of the three-dimensional optimal grasping position based on the stability of grasp." Proceedings of the 31st lecture meeting by the Robotics Society of Japan, The Robotics Society of Japan. Sep. 4-6, 2013. RSJ2013AC3G3-01. 16 pages.

Japanese Office Action dated Mar. 9, 2021, in connection with corresponding JP Application No. 2018-075572 (11 pp., including machine-generated English translation).

* cited by examiner

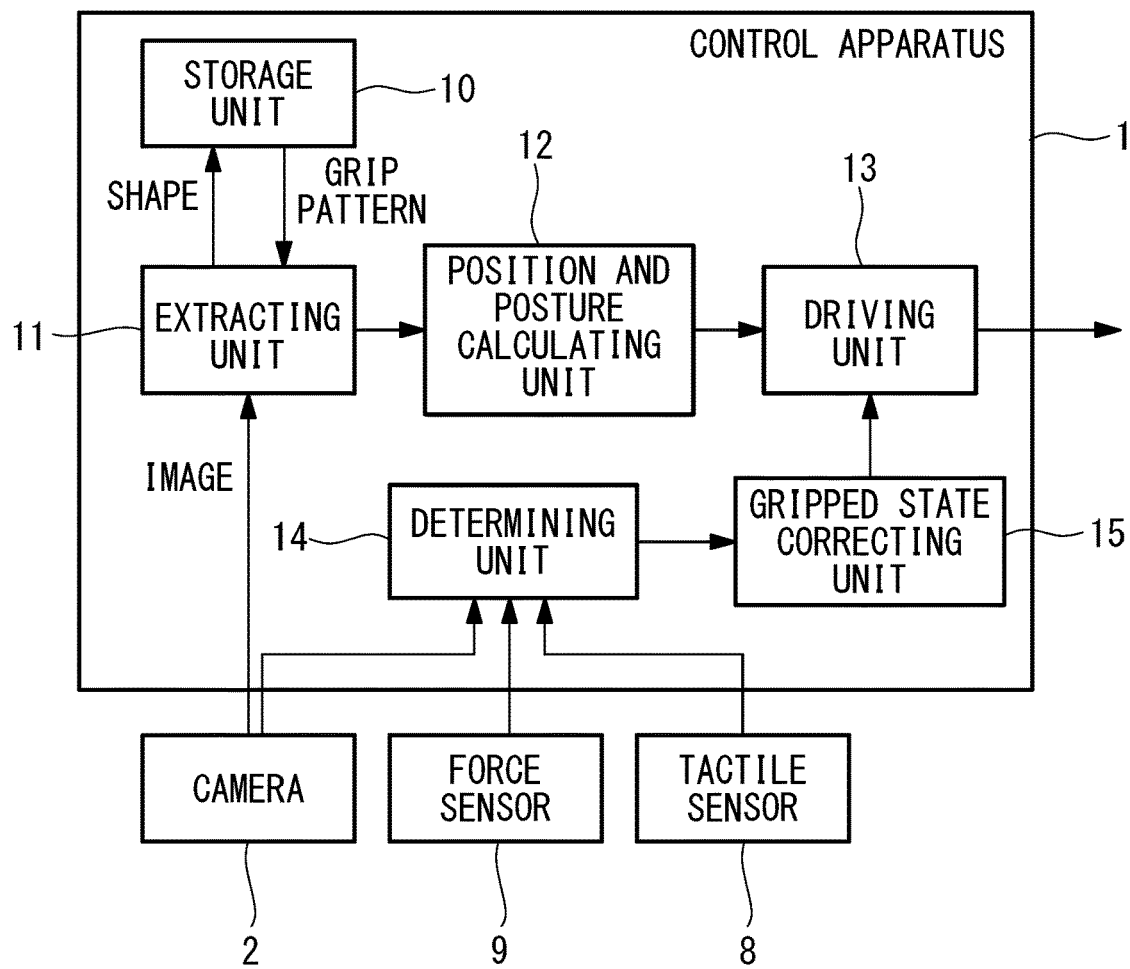

HAND CONTROL APPARATUS AND HAND CONTROL SYSTEM

CROSS-REFERENCE TO RELATED APPLICATIONS

This application is based on and claims priority to Japanese Patent Application No. 2018-075572 filed on Apr. 10, 2018, the content of which is incorporated herein by reference in its entirety.

FIELD

The present invention relates to a hand control apparatus and a hand control system.

BACKGROUND

Conventionally, when position information on an object to be gripped is detected from an image acquired by a visual sensor and the object to be gripped is gripped with a multi-fingered hand on the basis of the detected position information, a gripping method of detecting an actual contact position with respect to the object to be gripped on the basis of output of a force sensor at a multi-fingered hand portion and correcting the position information on the object to be gripped on the basis of information on the detected contact position is known (see, for example, Japanese Unexamined Patent Application, Publication No. 2012-11531).

In the gripping method of Japanese Unexamined Patent Application, Publication No. 2012-11531, the contact position is detected by the multi-fingered hand portion being brought into contact with the object to be gripped while maintaining a state in which the object to be gripped is at rest, and, after the position information on the object to be gripped obtained by the visual sensor is corrected, the object to be gripped is gripped with the multi-fingered hand portion on the basis of the corrected position information.

SUMMARY

An aspect of the present disclosure is a hand control apparatus that controls a hand which is provided at a robot including a shape acquiring unit, wherein the hand grips an object using a plurality of fingers each including a force sensor and a tactile sensor, the hand control apparatus including an extracting unit configured to extract a grip pattern of the object having a shape closest to a shape of the object acquired by the shape acquiring unit from a storage unit which stores shapes of a plurality of types of the objects and grip patterns by the hand in association with each other, a position and posture calculating unit configured to calculate a gripping position with respect to the object and an posture of the hand in accordance with the grip pattern extracted by the extracting unit, a hand driving unit configured to cause the hand to grip the object on the basis of the gripping position and the posture, which are calculated by the position and posture calculating unit, a determining unit configured to determine whether or not a griped state of the object is appropriate on the basis of information acquired by at least one of the shape acquiring unit, the force sensor and the tactile sensor, and a gripped state correcting unit configured to correct at least one of the gripping position and the posture, which are calculated by the position and posture calculating unit in the case where it is determined by the determining unit that the gripped state of the object is inappropriate.

BRIEF DESCRIPTION OF DRAWINGS

FIG. 3 is a block diagram illustrating the hand control apparatus in FIG. 1.

FIG. 4 is a diagram illustrating an example of a library stored in a storage unit provided in the hand control apparatus in FIG. 3.

DETAILED DESCRIPTION

A hand control apparatus 1 according to an embodiment of the present invention will be described below with reference to the drawings.

Figure 1:
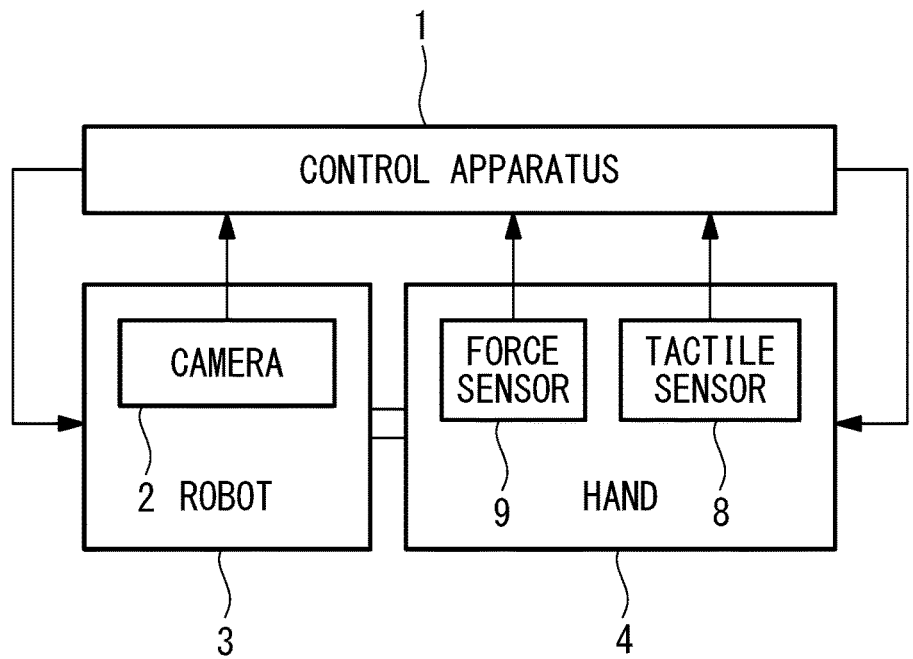
FIG. 1 is an entire configuration diagram illustrating a hand control apparatus according to an embodiment of the present invention.

As illustrated in FIG. 1, the hand control apparatus (hereinafter, simply referred to as a control apparatus) 1 according to the present embodiment is an apparatus which controls a robot 3 including a camera (shape acquiring unit) 2 and a hand 4 provided at the robot 3. The control apparatus 1 includes a processor and a memory, and controls the robot 3 and the hand 4 by the processor processing an operation program stored in the memory.

Figure 2:
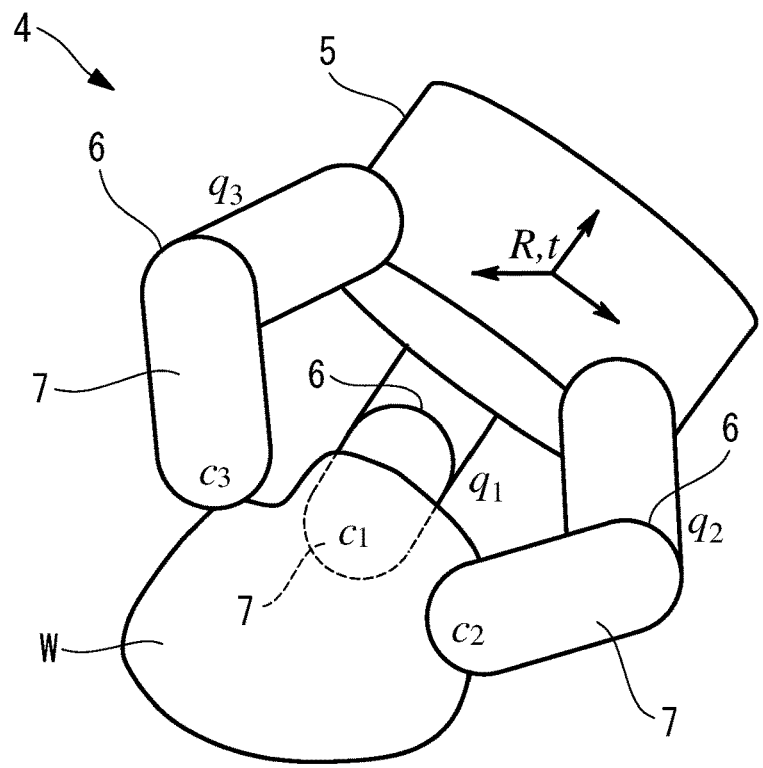
FIG. 2 is a diagram illustrating an example of a hand controlled by the hand control apparatus in FIG. 1.

For example, as illustrated in FIG. 2, the hand 4 includes a hand base 5 fixed at a tip of the robot 3, and a plurality of (for example, three) fingers 7 which are movable with respect to the hand base 5 and which have a plurality of joints 6 for gripping an object W. At each finger 7, a tactile sensor 8 which detects contact with the object W, a force sensor 9 which detects a contact pressure with the object W and an encoder which is not illustrated and which detects an angle of each joint 6 are provided.

As illustrated in FIG. 3, the control apparatus 1 includes a storage unit 10 which stores shapes of a plurality of types of objects W and grip patterns by the hand 4 in association with each other, and an extracting unit 11 which extracts a shape of the object W from an image acquired by the camera 2 and reads out from the storage unit 10 a grip pattern stored in the storage unit 10 in association with the object W having a shape closest to the extracted shape.

Further, the control apparatus 1 includes a position and posture calculating unit 12 which calculates a gripping position with respect to the object W and an posture of the hand 4 in accordance with the grip pattern extracted by the extracting unit 11, and a driving unit (hand driving unit) 13 which controls the robot 3 and the hand 4 to grip the object W on the basis of the calculated gripping position of the object W and posture of the hand 4.

Further, the control apparatus 1 includes a determining unit 14 which determines whether or not a gripped state of the object W is appropriate on the basis of information acquired by at least one of the camera 2, the force sensor 9 and the tactile sensor 8, and a gripped state correcting unit 15 which corrects at least one of the gripping position and the posture calculated by the position and posture calculating unit 12 in the case where it is determined by the determining unit 14 that the gripped state of the object W is inappropriate.

For example, as illustrated in FIG. 4, the storage unit 10 stores types of the object W, image examples and grip patterns in association with each other as a library. A plurality of image examples may be stored for one type of the object W. Examples of the grip patterns can include, for example, gripping force in accordance with the type of the object W, arrangement of contact positions of the respective fingers 7 of the hand 4 with respect to the object W, or the like.

The extracting unit 11 compares an image of the object W extracted from the image acquired by the camera 2 and images stored in the library through pattern matching, or the like, to extract a type of the object W corresponding to an image having the closest shape, and reads out a grip pattern stored in association with the extracted type of the object W.

The position and posture calculating unit 12 calculates a gripping position by the hand 4 with respect to the object W that is, a position and an posture of the hand 4 on the basis of the grip pattern read out by the extracting unit 11. Because the calculated position and posture are based on the grip pattern for the object W having a close shape stored in the library, there is a case where the calculated position and posture are not optimum.

According to the hand control apparatus 1 according to the present embodiment, determination is performed by the determining unit 14 in a state where the object W is gripped by the hand 4 on the basis of the grip pattern extracted from the library, and correction operation is performed by the gripped state correcting unit 15 on the basis of the determination result.

Specifically, gripping stability, operability of the hand 4 and the contact force are optimized.

The gripping stability is, for example, optimized using Math 1 so that an area of a polygon having contact points of respective fingers 7 with respect to the object W as apexes becomes a maximum.

{Math 1}

$$\max_{c,q} Q_1(c_n, q_m) \quad (1)$$

$$FK(c_n, q_m, R, t) = 0 \quad (2)$$

$$s(c) = 0 \quad (3)$$

$$q \in [q_{min}, q_{max}] \quad (4)$$

Expression (1) is an evaluation function indicating gripping stability, $Q_1$ is an area of a polygon, $c_n$ is a contact position of the finger 7 with respect to the object W, $q_m$ is an angle of the joint 6 of the finger 7. Here, a subscript n is a number of the finger 7, and a subscript m is a number of the joint 6.

Expressions (2), (3) and (4) are restriction conditions for expression (1), expression (2) indicates kinetic relation including a direction R and a position t in a coordinate system fixed at the hand base 5 of the hand 4 illustrated in FIG. 2, expression (3) indicates restriction on the contact position $c_n$ (for example, the contact position should be located on a surface of the object W, or the like), and expression (4) indicates angle restriction on the joint 6 of each finger 7.

The operability of the hand 4 is, for example, optimized using Math 2 so that the angle $q_m$ of the joint 6 of each finger 7 approaches a median in a restricted angle range.

{Math 2}

$$\max_{q} Q_2(q_m) \quad (5)$$

$$FK(c_n, q_m, R, t) = 0 \quad (6)$$

$$q \in [q_{min}, q_{max}] \quad (7)$$

Expression (5) is an evaluation function indicating the operability of the hand 4, and $Q_2$ indicates closeness of the angle of the joint 6 to the median in the restricted angle range. Expressions (6) and (7) are restriction conditions for expression (5), expression (6) is kinetic relation based on the contact position of each finger 7 and the coordinate system of the hand base 5, and expression (7) is the restricted angle range of the joint 6 of each finger 7.

The contact force is, for example, optimized using Math 3 so that equilibrium is achieved among the contact force, gravity acting on the object W and external force.

{Math 3}

$$\max_{\tau} Q_3(f) \quad (8)$$

$$FK(q_m, \tau, f) = 0 \quad (9)$$

$$f \in [f_{min}, f_{max}] \quad (10)$$

Expression (8) is an evaluation function indicating equilibrium among the contact force f, the gravity and the external force, and $Q_3$ indicates a degree of equilibrium. Expressions (9) and (10) are restriction conditions for expression (8), expression (9) is kinetic relation including the contact force, the angle $q_m$ of the joint 6 of each finger 7 and torque $\tau$, and expression (10) is restriction on the contact force.

Operation of the hand control apparatus 1 according to the present embodiment will be described next.

Figure 5:
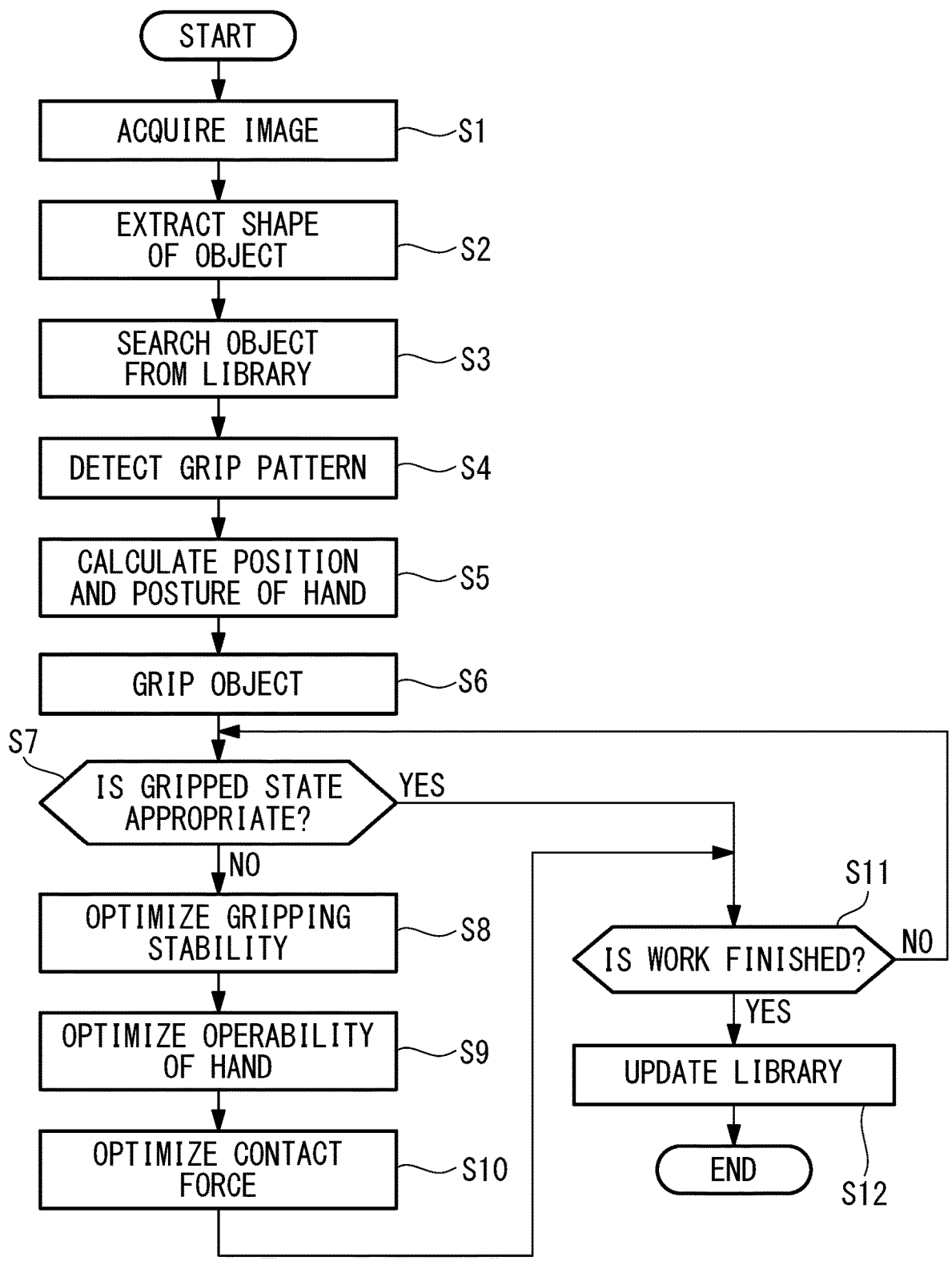
FIG. 5 is a flowchart illustrating control sequence of the hand by the hand control apparatus in FIG. 1.

First, as illustrated in FIG. 5, when an image of the object W is acquired by the camera 2 provided at the robot 3 (step S1), the acquired image is transmitted to the extracting unit 11 of the hand control apparatus 1 and subjected to image processing, and a shape of the object W is extracted (step S2). In the extraction, a type of the object W having the closest shape is searched using the extracted shape as a key within a library stored within the storage unit 10 (step S3).

Then, the extracting unit 11 detects a grip pattern stored within the library in association with the searched type of the object W and transmits the grip pattern to the position and posture calculating unit 12 (step S4). The position and posture calculating unit 12 calculates a position and an posture of each finger 7 of the hand 4 on the basis of the transmitted grip pattern and outputs the position and the posture to the driving unit 13 (step S5). The driving unit 13 controls the robot 3 and the hand 4 to grip the object W at the position and with the posture transmitted from the position and posture calculating unit 12 (step S6).

It is determined by the determining unit 14 whether or not a contact state is appropriate on the basis of the image acquired by the camera 2, a contact pressure detected by the force sensor 9 and the contact state detected by the tactile sensor 8 in a state where the object W is gripped (step S7). In the case where it is determined that the contact state is not appropriate, the gripping stability is optimized (step S8), the operability of the hand 4 is optimized (step S9), and the contact force is optimized (step S10).

It is determined whether or not work is finished (step S11), and, in the case where the work is not finished, process from step S7 is repeated. In the case where the work is finished, the library is updated by the type of the object W, the image and the optimized grip pattern being registered in the library (step S12), and all the process is finished. Further, in the process in step S7, in the case where it is determined that the contact state is appropriate, the process in step S11 is executed.

Figure 6A:
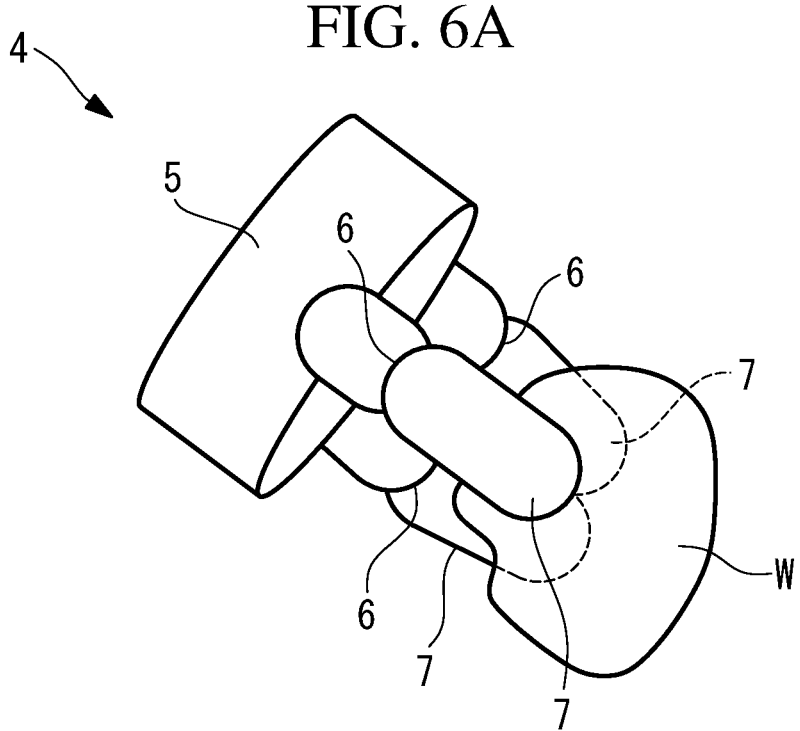
FIG. 6A is a diagram illustrating gripping stability by the hand control apparatus in FIG. 3 before optimization.
Figure 6B:
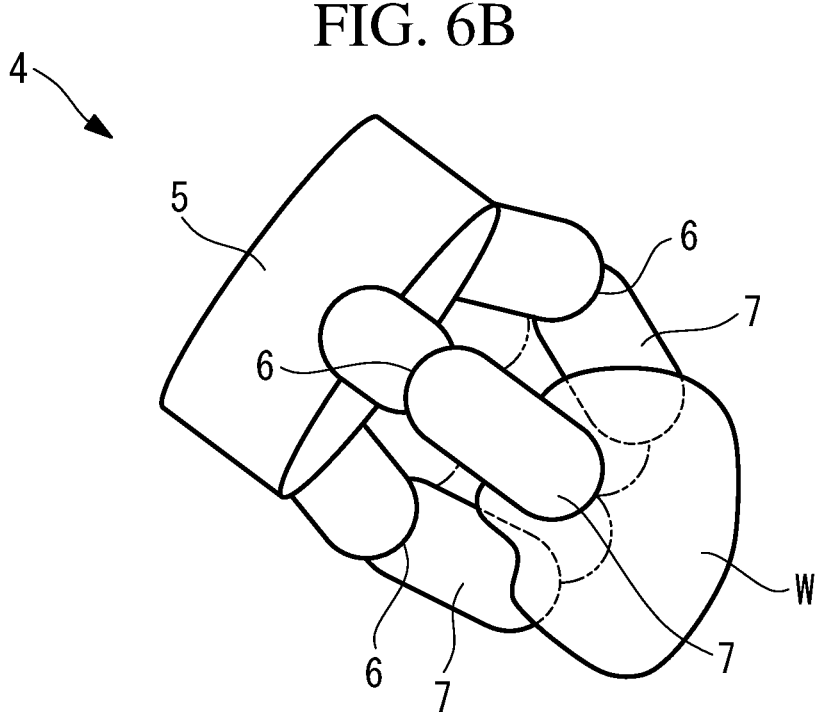
FIG. 6B is a diagram illustrating gripping stability by the hand control apparatus in FIG. 3 after optimization.

In this manner, according to the hand control apparatus 1 according to the present embodiment, the gripping stability is optimized using Math 1. FIG. 6A illustrates the positions and the postures of the fingers 7 of the hand before optimizing. As illustrated in FIG. 6B, after optimization, the positions and the postures of the fingers 7 of the hand 4 are corrected so that the area of the polygon having contact points of the fingers 7 with the object W as apexes becomes a maximum. That is, an advantage is provided that it is possible to make the gripped state more stable by increasing the area of the polygon by releasing one of the fingers 7 from the object W and moving it in a state where the object W is gripped with a plurality of fingers 7 of the hand 4.

Figure 7A:
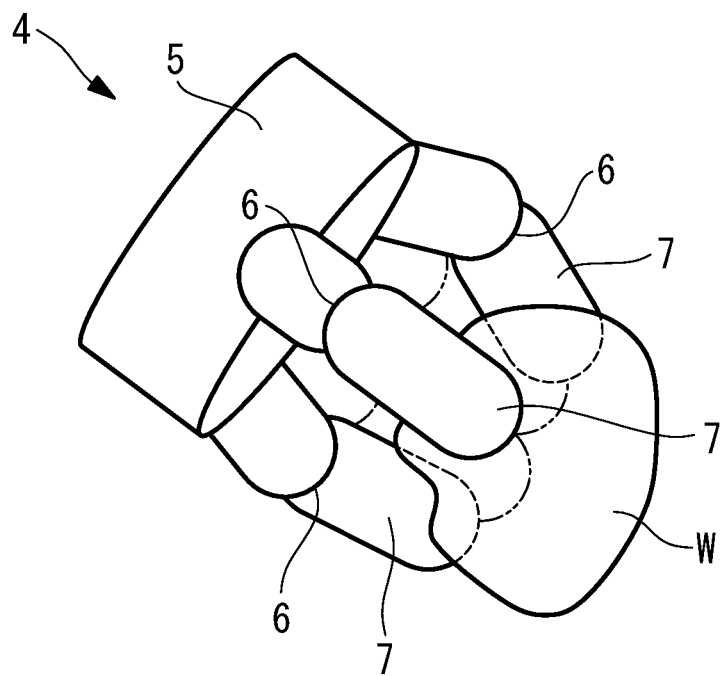
FIG. 7A is a diagram illustrating operability of the hand by the hand control apparatus in FIG. 3 before optimization.
Figure 7B:
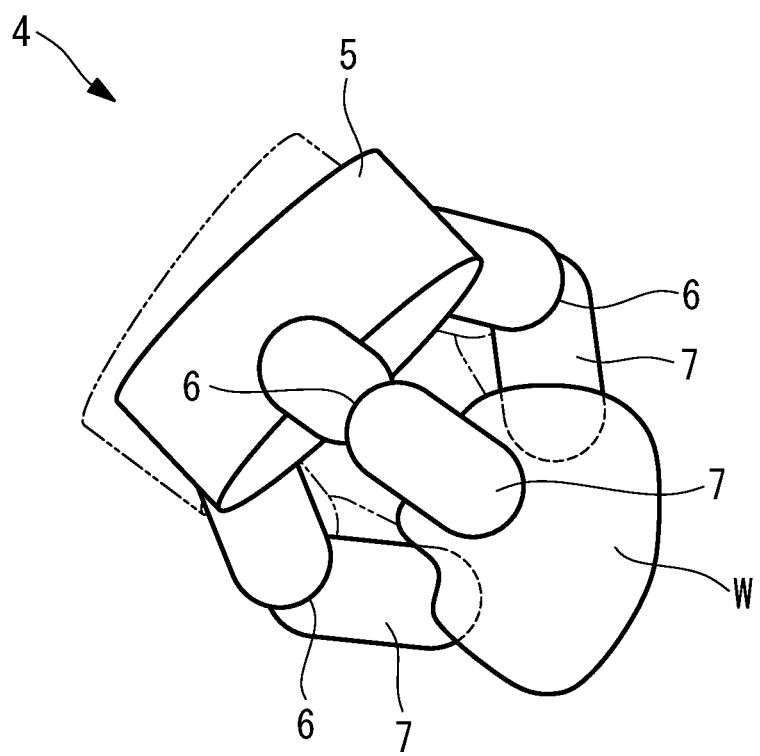
FIG. 7B is a diagram illustrating operability of the hand by the hand control apparatus in FIG. 3 after optimization.

Further, the operability of the hand 4 is optimized using Math 2. FIG. 7A illustrates the operability of the hand before optimization. FIG. 7B illustrates the operability of the hand after optimization. In FIG. 7B, because the angle of the joint 6 of each finger 7 approaches the median in the restricted angle range, it is possible to make the gripped state a state where the angle of the joint 6 of the finger 7 can be easily changed in any direction while the object W remains to be gripped. By this means, an advantage is provided that it is possible to perform operation such as change of an angle by rotating the object W.

Figure 8A:
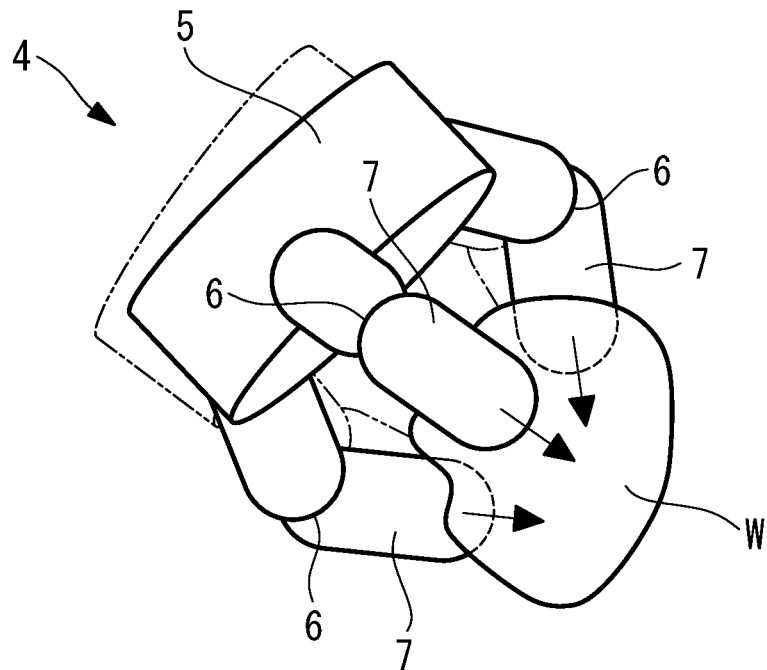
FIG. 8A is a diagram illustrating optimization of contact force by the hand control apparatus in FIG. 3 before optimization.
Figure 8B:
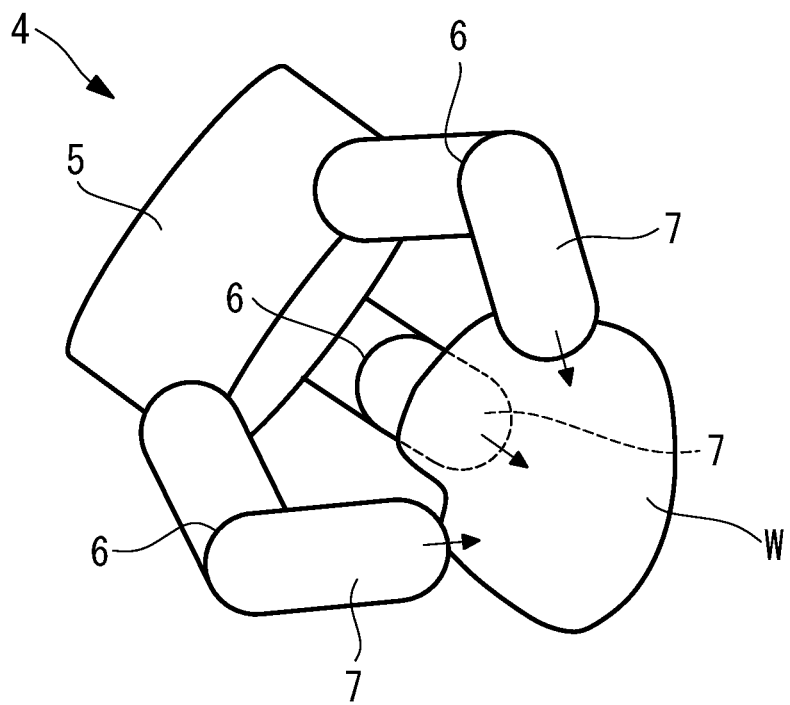
FIG. 8B is a diagram illustrating optimization of contact force by the hand control apparatus in FIG. 3 after optimization.

Further, the contact force is optimized using Math 3. FIG. 8A illustrates the contact force before optimization. FIG. 8B illustrates the contact force after optimization, and it is possible to grip the object W with contact force with which the object W does not drop within a restriction range of the contact force in accordance with the type of the object W. For example, because an upper limit of the contact force is set for a soft object such as food, while it is impossible to make the contact force excessively large, if the contact force is too small, the object drops as a result of balance with the gravity or the external force being lost. Therefore, it is necessary to achieve optimum contact force with which the object W is not damaged and does not drop. Further, in the case where a magnitude of the external force changes during work on the object W, it is necessary to generate contact force sufficient to prevent the object from dropping even if such external force acts. By the contact force being optimized using Math 3, an advantage is provided that it is possible to address these cases.

Note that, while, in the present embodiment, the control apparatus 1 optimizes the gripping stability, the operability of the hand and the gripping force, the control apparatus 1 may optimize at least one of these. Further, the optimization may be performed on the basis of at least one of the image acquired by the camera 2, the contact pressure detected by the force sensor 9 and the contact state detected by the tactile sensor 8.

Further, the hand 4 and the robot 3 may have any forms.

Further, while, in the present embodiment, an apparatus which stores shapes of a plurality of types of objects W and grip patterns by the hand 4 in association with each other is described as an example of the control apparatus 1, an apparatus in which shapes of a plurality of types of objects W and elastic moduli are stored and associated with grip patterns by the hand 4 may be used. In this case, the hand 4 is caused to grip the object W with gripping force in accordance with an elastic modulus of the object W extracted by the extracting unit 11.

Figure 9:
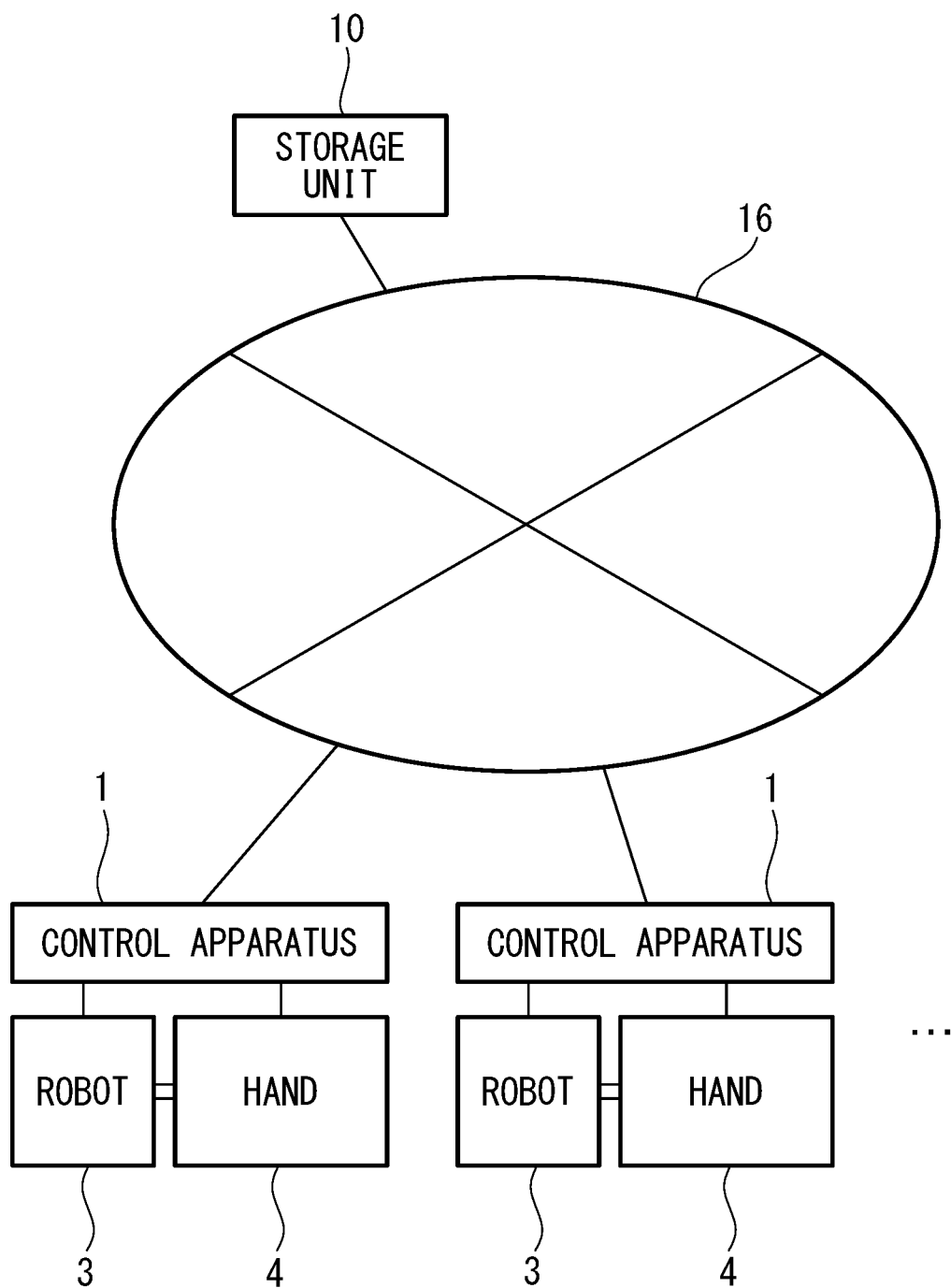
FIG. 9 is a diagram illustrating a hand control system according to an embodiment of the present invention.

Further, while the control apparatus 1 includes the storage unit 10 which stores the library, in place of this, as illustrated in FIG. 9, a hand control system in which the control apparatuses 1 connected to a plurality of robots 3 are connected to each other via a network 16 and the storage unit 10 is connected to the network 16 may be employed.

According to this configuration, an advantage is provided that it is possible to share the latest grip pattern registered by one of the control apparatuses 1 among the respective control apparatuses 1 via the network 16 as the grip pattern extracted from the storage unit 10 using the shape of the object W.

From the above-described embodiments, the following aspects of the present disclosure are derived.

An aspect of the present disclosure is a hand control apparatus that controls a hand which is provided at a robot including a shape acquiring unit, wherein the hand grips an object using a plurality of fingers each including a force sensor and a tactile sensor, the hand control apparatus including an extracting unit configured to extract a grip pattern of the object having a shape closest to a shape of the object acquired by the shape acquiring unit from a storage unit which stores shapes of a plurality of types of the objects and grip patterns by the hand in association with each other, a position and posture calculating unit configured to calculate a gripping position with respect to the object and an posture of the hand in accordance with the grip pattern extracted by the extracting unit, a hand driving unit configured to cause the hand to grip the object on the basis of the gripping position and the posture, which are calculated by the position and posture calculating unit, a determining unit configured to determine whether or not a griped state of the object is appropriate on the basis of information acquired by at least one of the shape acquiring unit, the force sensor and the tactile sensor, and a gripped state correcting unit configured to correct at least one of the gripping position and the posture, which are calculated by the position and posture calculating unit in the case where it is determined by the determining unit that the gripped state of the object is inappropriate.

According to the present aspect, if the shape of the object is acquired by the shape acquiring unit, a grip pattern of the object having a shape closest to the acquired shape of the object is extracted from the storage unit, and the gripping position with respect to the object and the posture of the hand are calculated by the position and posture calculating unit in accordance with the extracted grip pattern. It is determined by the determining unit whether or not the gripped state of the object is appropriate on the basis of information acquired by at least one of the shape acquiring unit, the force sensor and the tactile sensor, in a state where the object is gripped with the hand by the hand driving unit on the basis of the calculated gripping position of the object and posture of the hand.

Then, in the case where it is determined by the determining unit that the gripped state is inappropriate, at least one of the gripping position of the object and the posture of the hand, which are calculated by the position and posture calculating unit, is corrected by the gripped state correcting unit.

That is, whether or not the gripped state is appropriate is determined in a state where the object is gripped with the hand, and, in the case where the gripped state is inappropriate, the gripped state is appropriately corrected by at least one of the gripping position and the posture being corrected, so that it is possible to grip the object more reliably.

In the above-described aspect, the gripped state correcting unit may adjust at least one of gripping stability of the object, operability of the hand and gripping force of the hand with respect to the object by correcting the gripping position or the posture.

According to this configuration, it is possible to grip the object more reliably by improving gripping stability of the object in the case where the gripped state of the object is not stable, improving operability of the hand by changing the gripped state to a gripped state with a high degree of freedom in the case where the gripped state is uncomfortable, and making gripping force more appropriate in the case where the gripping force is too strong or too weak.

Further, in the above-described aspect, the shapes of the plurality of types of the objects and elastic moduli may be stored and associated with the grip patterns by the hand, and the hand driving unit may cause the hand to grip the object with gripping force in accordance with an elastic modulus of the object extracted by the extracting unit.

According to this configuration, it is possible to grip even an elastic object with more appropriate gripping force.

Further, in the above-described aspect, in the case where the gripping position or the posture is corrected by the gripped state correcting unit, grip patterns based on the corrected gripping position and posture may be stored in the storage unit in association with the shape of the object acquired by the shape acquiring unit.

According to this configuration, it is possible to store the gripping position and the posture which are corrected on the basis of information acquired by at least one of the shape acquiring unit, the force sensor and the tactile sensor in the storage unit in association with the shape of the object, so that it is possible to increase items in a library available in next and subsequent gripping operation.

Further, in the above-described aspect, the storage unit may be provided.

Further, another aspect of the present invention is a hand control system including a network, a plurality of hand control apparatuses described in any of the above connected via the network, and the storage unit connected to the network.

According to the present aspect, it is possible to share the grip pattern extracted from the storage unit using the shape of the object among the hand control apparatuses via the network.

According to the aforementioned aspects, advantageous effects are provided that it is possible to appropriately correct a gripped state in which an object to be gripped is gripped and more reliably gripping the object to be gripped.

REFERENCE SIGNS LIST 1 control apparatus (hand control apparatus)
2 camera (shape acquiring unit)
3 robot
4 hand
7 finger
8 tactile sensor
9 force sensor
10 storage unit
11 extracting unit
12 position and posture calculating unit
13 driving unit (hand driving unit)
14 determining unit
15 gripped state correcting unit
16 network
W object

The invention claimed is:

1. A hand control apparatus that controls a hand which is provided at a robot including a camera, wherein the hand grips an object using a plurality of fingers each including a force sensor and a tactile sensor, wherein the hand control apparatus is configured to:
  extract a grip pattern of the object having a shape closest to a shape of the object acquired by the camera from a storage unit which stores shapes of a plurality of types of the objects and the grip patterns by the hand in association with each other;
  calculate a gripping position with respect to the object and posture of the hand in accordance with the grip pattern thus extracted;
  cause the hand to grip the object on a basis of the gripping position and the posture which are thus calculated;
  determine whether or not a gripped state of the object is appropriate on a basis of information acquired by at least one of the force sensor and the tactile sensor; and
  correct at least one of the gripping position and the posture which are thus calculated when it is determined that the gripped state of the object is inappropriate,
  wherein, in the storage unit, the shapes of the plurality of types of the objects and elastic moduli are stored and associated with the grip patterns by the hand, and
  wherein the hand control apparatus causes the hand to grip the object with gripping force in accordance with an elastic modulus of the object.

2. The hand control apparatus according to claim 1, wherein the control apparatus is further configured to adjust at least one of gripping stability of the object, operability of the hand, and gripping force of the hand with respect to the object by correcting the gripping position and the posture.

3. The hand control apparatus according to claim 1, wherein, in a case where the gripping position or the posture is corrected, a grip pattern based on the corrected gripping position and posture is stored in the storage unit in association with the shape of the object acquired by the camera.

4. A hand control system comprising:
a network;
a plurality of the hand control apparatuses according claim 1 connected via the network; and
the storage unit connected to the network.

5. The hand control apparatus according to claim 1, wherein, in a case where the gripping position or the posture is corrected, a grip pattern based on the corrected gripping position and posture is subsequently stored in the storage unit in association with the shape of the object acquired by the camera.

\* \* \* \* \*